United States Patent
Bulinski et al.

(10) Patent No.: US 10,703,833 B2
(45) Date of Patent: Jul. 7, 2020

(54) AMINE-CONTAINING POLYMERS, DISPERSIONS THEREOF AND METHODS OF MAKING AND USING THE SAME

(71) Applicant: 3M INNOVATIVE PROPERTIES COMPANY, St. Paul, MN (US)

(72) Inventors: Michael J. Bulinski, Stillwater, MN (US); Michael G. Costello, Afton, MN (US); Denis Duchesne, Woodbury, MN (US); Klaus Hintzer, Kastl (DE); William M. Lamanna, Stillwater, MN (US); Kai H. Lochhaas, Neuotting (DE); Michael J. Parent, Lake Elmo, MN (US); Sean M. Smith, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/781,163

(22) PCT Filed: Dec. 13, 2016

(86) PCT No.: PCT/US2016/066253
§ 371 (c)(1),
(2) Date: Jun. 4, 2018

(87) PCT Pub. No.: WO2017/106119
PCT Pub. Date: Jun. 22, 2017

(65) Prior Publication Data
US 2018/0319908 A1 Nov. 8, 2018

Related U.S. Application Data

(60) Provisional application No. 62/268,665, filed on Dec. 17, 2015.

(51) Int. Cl.
| C08F 14/22 | (2006.01) |
| C09D 127/16 | (2006.01) |
| C09D 127/18 | (2006.01) |
| C08F 214/26 | (2006.01) |
| C08F 214/22 | (2006.01) |
| C09D 127/12 | (2006.01) |
| C08F 214/18 | (2006.01) |
| C08F 2/16 | (2006.01) |
| C08F 14/24 | (2006.01) |
| C08F 14/26 | (2006.01) |
| C08F 14/28 | (2006.01) |
| C08F 26/02 | (2006.01) |
| C08F 26/06 | (2006.01) |
| C09D 127/20 | (2006.01) |
| C08F 226/06 | (2006.01) |
| C08F 226/02 | (2006.01) |

(52) U.S. Cl.
CPC .............. *C08F 14/22* (2013.01); *C08F 2/16* (2013.01); *C08F 14/24* (2013.01); *C08F 14/26* (2013.01); *C08F 14/28* (2013.01); *C08F 26/02* (2013.01); *C08F 26/06* (2013.01); *C08F 214/18* (2013.01); *C08F 214/22* (2013.01); *C08F 214/26* (2013.01); *C09D 127/12* (2013.01); *C09D 127/16* (2013.01); *C09D 127/18* (2013.01); *C09D 127/20* (2013.01); *C08F 226/02* (2013.01); *C08F 226/06* (2013.01)

(58) Field of Classification Search
None
See application file for complete search history.

(56) References Cited

U.S. PATENT DOCUMENTS

| 3,037,953 | A | | 6/1962 | Marks |
| 3,311,599 | A | | 3/1967 | Fawcett |
| 3,535,381 | A | * | 10/1970 | Hager ............ C08F 26/02 564/391 |
| 4,369,266 | A | | 1/1983 | Kuhls |
| 4,661,231 | A | | 4/1987 | Matsui |
| 4,985,556 | A | | 1/1991 | Abe |
| 5,225,504 | A | | 7/1993 | Tatsu |
| 5,463,021 | A | | 10/1995 | Beyer |
| 6,114,452 | A | | 9/2000 | Schmiegel |
| 6,153,688 | A | | 11/2000 | Miura |
| 6,794,550 | B2 | | 9/2004 | Hintzer |
| 6,833,403 | B1 | | 12/2004 | Bladel |

(Continued)

FOREIGN PATENT DOCUMENTS

| EP | 0829471 | 3/1998 |
| EP | 0927185 | 7/1999 |

(Continued)

OTHER PUBLICATIONS

Machine translation of JP 07118348 A, retrieved Oct. 2019. (Year: 2019).*
Hayakawa et a. "Plasma polymerization of cyclic perfluoroamines and composite membranes of gas separation", Journal of Applied Polymer Science, 1996, 62(6), 951-956. (Year: 1996).*
Hayakawa, "New Perfluoropolymers Bearing Dialkylamino Groups As Side Chains", Polymer, 1995, vol. 36, No. 14, pp. 2807-2812.
International Search Report for PCT International Application No. PCT/US2016/066253, dated Mar. 30, 2017, 4 pages.

*Primary Examiner* — Nicole M. Buie-Hatcher
(74) *Attorney, Agent, or Firm* — Julie Lapos-Kuchar

(57) ABSTRACT

Described herein is a polymer comprising: interpolymerized units of (i) a fluorinated terminal alkene monomer and (ii) a tertiary amine-containing fluorinated monomer comprising at least one of a vinyl amine, a substituted vinyl amine, an allyl amine, a substituted allyl amine, and combinations thereof; wherein the polymer can be amorphous or semi-crystalline with a melting point no greater than 325° C. Dispersions thereof and methods of making and using the same are also described.

14 Claims, No Drawings

(56) References Cited

U.S. PATENT DOCUMENTS

| | | | |
|---|---|---|---|
| 7,125,941 B2 * | 10/2006 | Kaulbach | C08F 114/18 |
| | | | 526/247 |
| 7,279,522 B2 | 10/2007 | Dadalas | |
| 7,671,112 B2 | 3/2010 | Hintzer | |
| 8,604,137 B2 | 12/2013 | Grootaert | |
| 2007/0015937 A1 | 1/2007 | Hintzer | |
| 2007/0032891 A1 * | 2/2007 | Choi | A61M 5/14244 |
| | | | 700/65 |
| 2013/0090441 A1 | 4/2013 | Baran, Jr. | |

FOREIGN PATENT DOCUMENTS

| | | |
|---|---|---|
| EP | 1526142 | 4/2005 |
| EP | 1538177 | 6/2005 |
| JP | 60-009969 | 1/1985 |
| JP | 63-022546 | 1/1988 |
| JP | 64-070445 | 3/1989 |
| JP | 07118348 A * | 5/1995 |
| WO | WO-2015095285 A1 * | 6/2015 |
| WO | WO 2016-196240 | 12/2016 |
| WO | WO 2017-095732 | 6/2017 |

* cited by examiner

AMINE-CONTAINING POLYMERS, DISPERSIONS THEREOF AND METHODS OF MAKING AND USING THE SAME

CROSS REFERENCE TO RELATED APPLICATIONS

This application is a national stage filing under 35 U.S.C. 371 of PCT/US2016/066253, filed Dec. 13, 2016, which claims the benefit of U.S. Application No. 62/268665, filed Dec. 17, 2015, the disclosure of which is incorporated by reference in its/their entirety herein.

TECHNICAL FIELD

Amine-containing polymers and polymer dispersions are disclosed along with the method of making and using them.

BACKGROUND

Fluoropolymers have been long known and have been used in a variety of applications because of several desirable properties such as heat resistance, chemical resistance, weatherability, UV-stability, low friction and anti-stick properties, etc.

To improve the thermal and chemical resistance of a substrate or to provide anti stick or low friction properties to a substrate, the substrate is coated or impregnated with fluoropolymers. The fluoropolymers may be applied to the substrate by liquid coating techniques if they are provided as a liquid formulation, such as for example, dispersions.

Fluoropolymer dispersions can be conveniently produced by aqueous polymerization techniques. Aqueous polymerization, wherein the continuous phase is water-based can be more desirable than solvent-based polymerizations, for a couple reasons. Water is generally easier to handle from an environmental, regulatory, and safety perspective. Further, there is not a need to dispose of large amounts of solvent as encountered in solvent polymerization.

SUMMARY

There is a desire for identifying alternative fluorinated polymers. Advantageously, the fluoropolymers of the present disclosure can also be offered as aqueous, stable dispersions.

In one aspect, an aqueous dispersion is described comprising a fluorinated polymer comprising:
  (a) an aqueous continuous phase;
  (b) a plurality of fluorinated polymer particles, wherein the fluorinated polymer particle comprises interpolymerized units of (i) a fluorinated terminal alkene monomer and (ii) a tertiary amine-containing fluorinated monomer comprising at least one of a vinyl amine, a substituted vinyl amine, an allyl amine, a substituted allyl amine, and combinations thereof.

In one embodiment, the aqueous dispersion further comprises a hydrocarbon surfactant.

In another aspect, a polymer is described comprising: interpolymerized units of (i) a fluorinated terminal alkene monomer and (ii) a tertiary amine-containing fluorinated monomer comprising at least one of a vinyl amine, a substituted vinyl amine, an allyl amine, a substituted allyl amine, and combinations thereof; wherein the polymer is amorphous or is semi-crystalline with a melting point no greater than 325° C.

In yet another aspect, a method of making a fluoropolymer is described, the method comprising: polymerizing in an aqueous continuous phase, (i) a fluorinated terminal alkene monomer and (ii) a tertiary amine-containing fluorinated monomer comprising at least one of a vinyl amine, a substituted vinyl amine, an allyl amine, a substituted allyl amine, and combinations thereof.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"backbone" refers to the main continuous chain of the polymer;

"crosslinking" refers to connecting two pre-formed polymer chains using chemical bonds or chemical groups;

"cure site" refers to functional groups, which may participate in crosslinking;

"interpolymerized" refers to monomers that are polymerized together to form a polymer backbone;

"monomer" is a molecule which can undergo polymerization which then form part of the essential structure of a polymer;

"perfluorinated" means a group or a compound wherein all the hydrogen atoms in the C—H bonds have been replaced by fluorine atoms to form C—F bonds. In one embodiment, all of the C—H bonds are replaced with C—F bond. Alternatively, the group or compound has no C—H bonds, and some of the C—F bonds are replaced with C—I, C—Cl, and/or C—Br bonds; and "polymer" refers to a macrostructure having a number average molecular weight (Mn) of at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed toward the polymerization of tertiary amine-containing fluorinated monomers in aqueous solutions to form fluoropolymers. The fluoropolymers may be amorphous or semi-crystalline in nature.

The tertiary amine-containing fluorinated monomers of the present disclosure comprise at least one of a vinyl amine, a substituted vinyl amine, an allyl amine, or a substituted allyl amine.

In one embodiment, the vinyl amine-containing monomers are of the general formula (I):

(I)

where $X^1$ is selected from H or F; $X^2$ is selected from H or F; $X^3$ is selected from H or F; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Exemplary vinyl amine-containing monomers include:

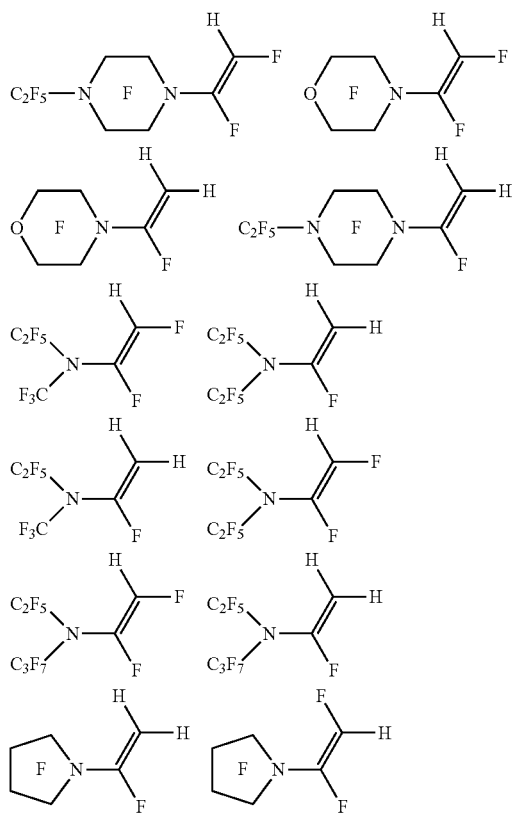

and combinations thereof.

In one embodiment, the substituted vinyl amine-containing monomers are of the general formula (II):

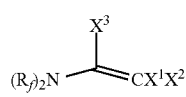
(II)

where $X^1$ is selected from H, F, or $CF_3$; $X^2$ is selected from H or F; $X^3$ is selected from H, F, or a C1-C4 alkyl or a C1-C4 fluoroalkyl, wherein at least one of $X^1$, $X^2$ or $X^3$ is not H or F; and each Rf group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Exemplary substituted vinyl amine-containing monomers include:

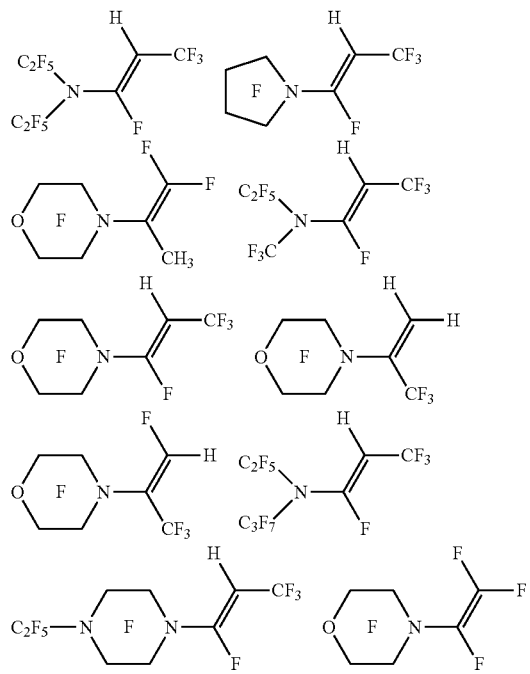

and combinations thereof.

In one embodiment, the tertiary amine-containing fluorinated monomers are of the general formula (III) :

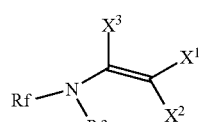
(III)

where $X^1$ is $CF_3$, F, or H; $X^2$ is F or H; $X^3$ is $CF_3$, F, $CF_2H$, or $CH_3$; each Rf group is (i) independently selected from a linear or branched fluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom; and the monomer includes a total of 1-4 hydrogen atoms; with the provisos that at least one of X and A is F or H; when A is $CF_3$ or F, at least one of X and Q is H; when A is $CH_3$, at least one of X and Q is F, and when X is $CF_3$, then Q is H and A is F; and wherein at least one of the Rf groups has two or more carbon atoms. Such molecules of Formula (III) are described in U.S. Prov. Appl. No. 62/171,446, filed 6/05/2015.

In one embodiment, the allyl amine-containing monomers are of the general formula (IV):

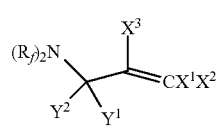
(IV)

where $X^1$, $X^2$, and $X^3$ are independently selected from H, or F; $Y^1$ is H or F; $Y^2$ is F or $CF_3$; and each $R_f$ group are (i)

independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Exemplary allyl amine-containing monomers include:

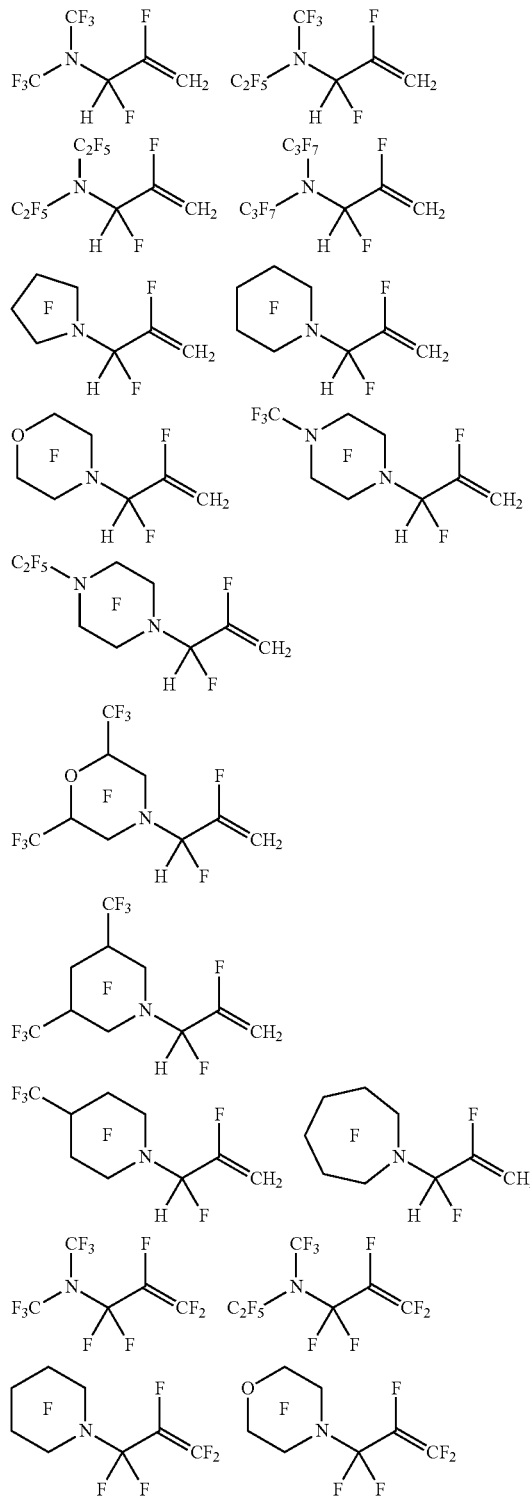

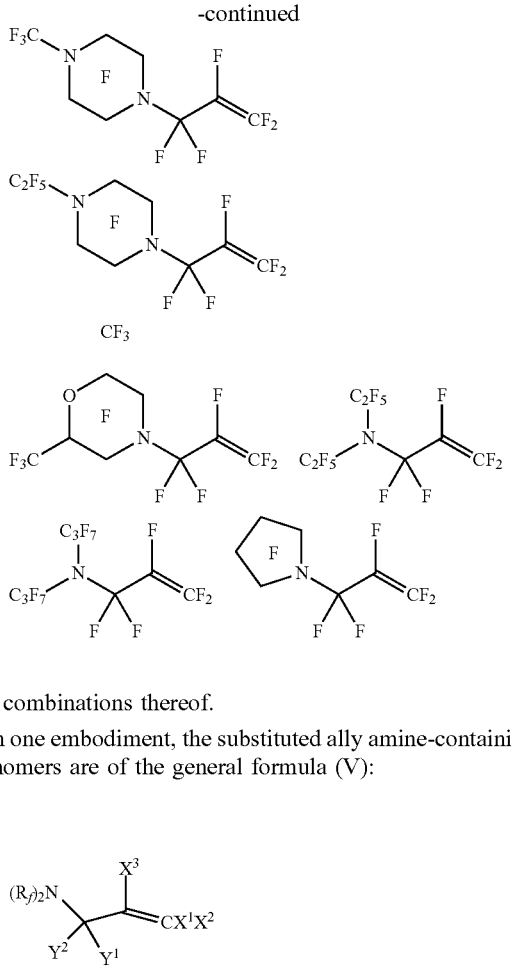

and combinations thereof.

In one embodiment, the substituted ally amine-containing monomers are of the general formula (V):

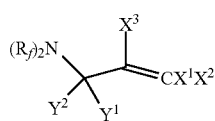

where $X^1$, $X^2$, and $X^3$ are independently selected from H, F, or $CF_3$; $Y^1$ is H or F; $Y^2$ is F or $CF_3$; wherein at least one of $X^1$, $X^2$, or $X^3$ is $CF_3$; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Exemplary substituted ally amine-containing monomers include:

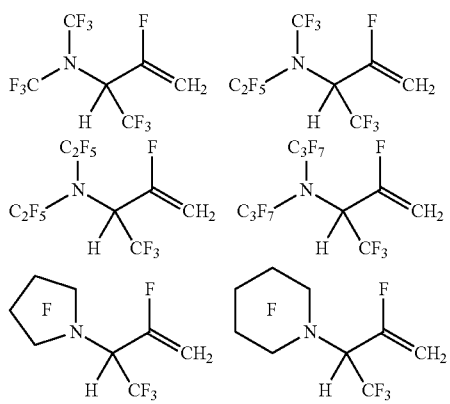

-continued
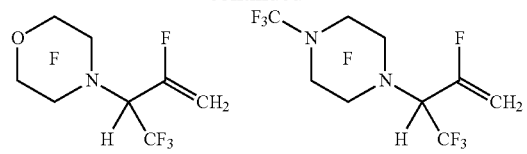
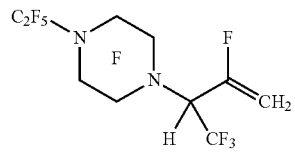
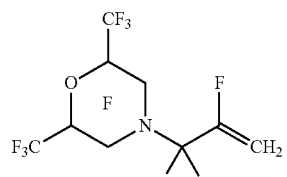
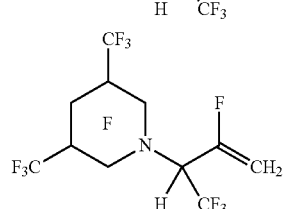
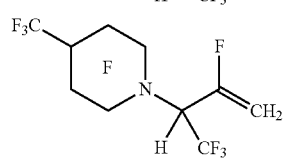
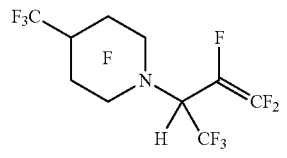
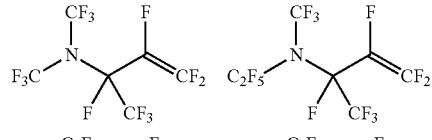
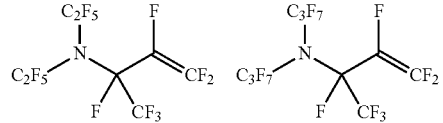
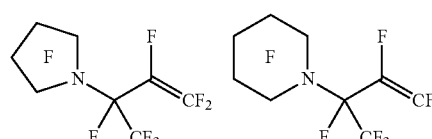
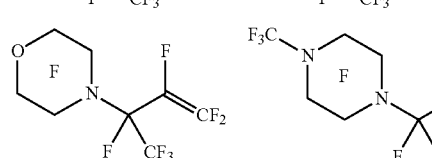
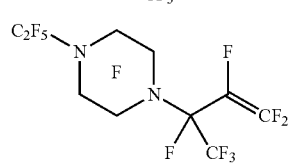
-continued
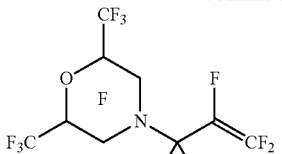
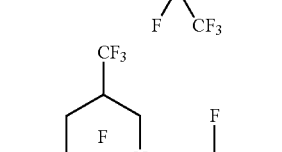
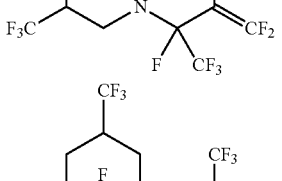
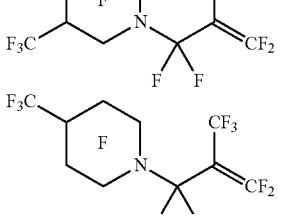
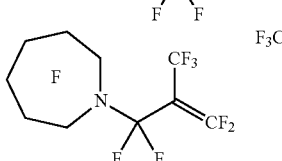
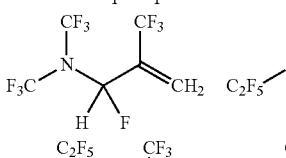
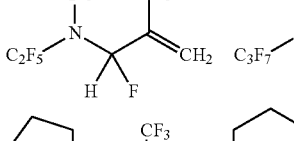
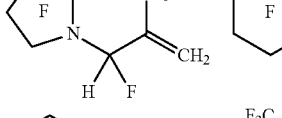
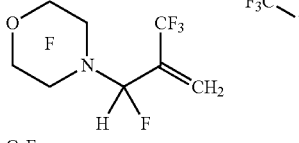
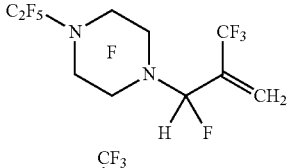
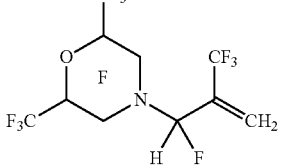

-continued

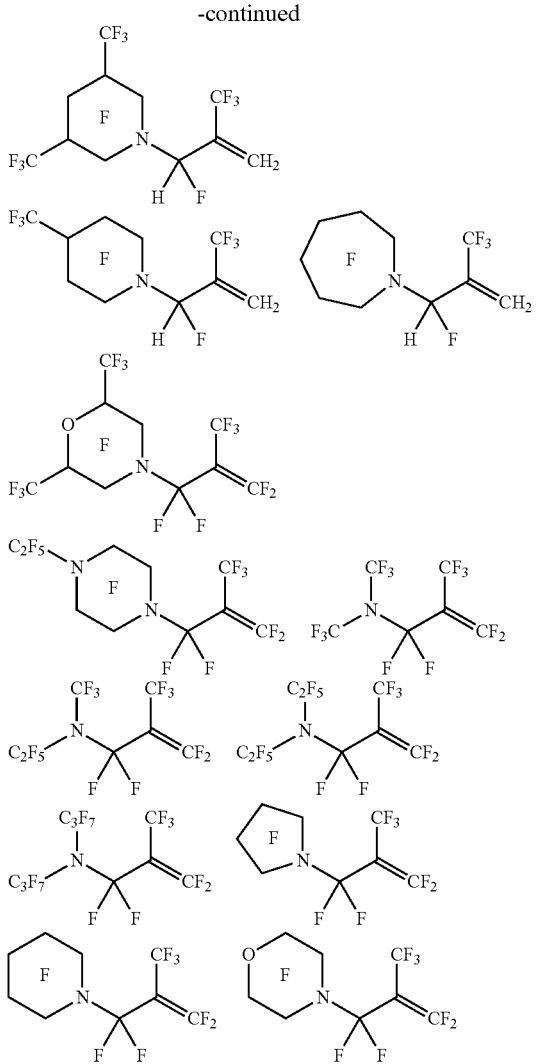

and combinations thereof.

In one embodiment, the tertiary amine-containing monomers are of the general formula (VI):

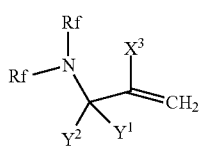

(VI)

where $X^3$ is F or $CF_3$; $Y^1$ is F or H; $Y^2$ is F or $CF_3$; and each Rf group is (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom with the proviso that when $Y^2$ is CF3 then $X^3$ is F and when $X^3$ is $CF_3$ then $Y^2$ is F. Such molecules of Formula (VI) are described in U.S. Prov. Appl. No. 62/262,200 filed 12/02/2015.

The fluorinated tertiary amine-containing monomer disclosed herein is polymerized in the presence of a fluorinated terminal alkene monomer. Such fluorinated terminal alkene monomer include: tetrafluoroethylene (TFE), hexafluoropropylene (HFP), vinylidene fluoride (VDF), vinyl fluoride, 2,3,3,3-tetrafluoropropene (R1234yf), and chlorotrifluoroethylene (CTFE).

In one embodiment, the tertiary amine-containing monomer is used at least 0.01, 0.1, 0.5, 1, or even 5 mole % and at most 10, 20, or even 40 mole % versus the other monomers in the fluoropolymer.

In one embodiment the fluoropolymer comprises: 0 to 99 mole % TFE; 0 to 99 mole % VDF; 0 to 30 mole % HFP; 0 to 99 mole % vinyl fluoride; 0 to 99mole % R1234yf; 0 to 99 mole % CTFE; and 0.01 to 40 mole % of the tertiary amine-containing monomer disclosed herein.

Additional fluorinated and non-fluorinated co-monomers may be used in the polymerization. Exemplary nonfluorinated co-monomers include: ethylene, and propylene. Exemplary fluorinated co-monomers include: partially fluorinated dienes such as $CH_2$=$CHR_fCH$=$CH_2$, wherein Rf is a perfluorinated alkylene group, which may comprise 2, 3, 4, 5, 6, 7, 8, 9, 10, 11, 12 carbon atoms for example; fluorinated alkyl vinyl ethers, fluorinated alkoxy vinyl ethers; and combinations thereof. In one embodiment, at least 0.1% and no more than 1, 3, or even 5 mole % of the partially fluorinated diene monomer is used in making the fluoropolymer (versus the other monomers). In one embodiment, at least 0.1% and no more than 5, 10, 20, or even 40 mole % of the fluorinated alkyl vinyl ethers and fluorinated alkoxy vinyl ethers is used in making the fluoropolymer (versus the other monomers).Examples of fluorinated co-monomers are of the Formula (VII)

$$CF_2=CF(CF_2)_bO(R_{f'}O)_n(R_{f'}O)_mR_{f'} \qquad (VII)$$

where $R^{f''}$ and $R^{f'}$ are independently linear or branched perfluoroalkylene radical groups comprising 2, 3, 4, 5, or 6 carbon atoms; b=0 or 1; m and n are independently an integer selected from 0, 1, 2, 3, 4, 5, 6, 7, 8, 9, and 10; and $R_f$ is a perfluoroalkyl group comprising 1, 2, 3, 4, 5, or 6 carbon atoms. Examplary perfluorovinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether (CF3—O—$CF_2$—O—CF=$CF_2$), and $CF_3$—$(CF_2)_2$—O—$CF(CF_3)$—$CF_2$—O—$CF(CF_3)$—$CF_2$—O—CF=$CF_2$, perfluoro (methyl allyl) ether ($CF_2$=CF—$CF_2$—O—$CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—$(CF_2)_2$—O—$CF(CF_3)$—CF2—O—$CF(CF_3)$—$CF_2$—O—$CF_2CF$=$CF_2$, and combinations thereof. In one embodiment, at least 0.1% and no more than 5, 10, 20, or even 40 mole % of the fluorinated co-monomers of Formula (VII) are used in making the fluoropolymer (versus the other monomers).

Other fluorinated co-monomers include those corresponding to formula: $CF_2$=CF—$R^d_f$ or $CH_2$=CH—$R^d_f$ wherein $R^d_f$ represents a perfluoroalkyl group of 1-10, or even 1-5 carbon atoms, which can be used in at least 0.1% and no more than 5 or even 10 mole % in making the fluoropolymer.

In the present disclosure, the fluorinated polymer may be polymerized in the presence of a halogenated chain transfer agent and/or cure site monomers to introduce cure sites into the fluoropolymer.

Exemplary chain transfer agents include: an iodo-chain transfer agent, a bromo-chain transfer agent, or a chlorochain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutan, and mixtures thereof. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Cure-site monomers, if used, comprise at least one of a bromine, iodine, and/or nitrile cure moiety. Typically, cure site monomers are used at least at 0.01, 0.1, 0.5, or even 1% and at most 2, 4, or even 5 mole % versus the other monomers used to make the fluoropolymer.

In one embodiment, the cure site monomers may be derived from one or more compounds of the formula: (a) $CX_2=CX(Z)$, wherein: (i) X each is independently H or F; and (ii) Z is I, Br, $R_f$—U wherein U=I or Br and $R_f$=a perfluorinated or partially perfluorinated alkylene group optionally containing O atoms or (b) $Y(CF_2)_qY$, wherein: (i) Y is Br or I or Cl and (ii) q=1-6. In addition, non-fluorinated bromo-or iodo-olefins, e.g., vinyl iodide and allyl iodide, can be used. In some embodiments, the cure site monomers are derived from one or more compounds selected from the group consisting of $CH_2=CHI$, $CF_2=CHI$, $CF_2=CFI$, $CH_2=CHCH_2I$, $CF_2=CFCF_2I$, $ICF_2CF_2CF_2CF_2I$, $CH_2=CHCF_2CF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3$—O—$CF_2CF_2I$, $CF_2=CF$—O—$(CF_2)_4$—I, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFCl$, $CF_2=CFCF_2Cl$, and combinations thereof.

In another embodiment, the cure site monomers comprise nitrile-containing cure moieties. Useful nitrogen-containing cure site monomers include nitrile-containing fluorinated olefins and nitrile-containing fluorinated vinyl ethers, such as: perfluoro(8-cyano-5-methyl-3,6-dioxa-1-octene); $CF_2=CFO(CF_2)_LCN$ wherein L is an integer from 2 to 12; $CF_2=CFO(CF_2)_uOCF(CF_3)CN$ wherein u is an integer from 2 to 6; $CF_2=CFO[CF_2CF(CF_3)O]_q(CF_2O)_yCF(CF_3)CN$ or $CF_2=CFO[CF_2CF(CF_3)O]_q(CF_2)_yOCF(CF_3)CN$ wherein q is an integer from 0 to 4 and y is an integer from 0 to 6; or $CF_2=CF[OCF_2CF(CF_3)]_rO(CF_2)_tCN$ wherein r is 1 or 2, and t is an integer from 1 to 4; and derivatives and combinations of the foregoing. Examples of a nitrile-containing cure site monomer include $CF_2=CFO(CF_2)_5CN$, $CF_2=CFOCF_2CF(CF_3)OCF_2CF_2CN$, $CF_2=CFOCF_2CF(CF_3)OCF_2CF(CF_3)CN$, $CF_2=CFOCF_2CF_2CF_2OCF(CF_3)CN$, $CF_2=CFOCF_2CF(CF_3)OCF_2CF_2CN$; and combinations thereof.

The polymers of the present disclosure are obtained with any of the known aqueous polymerization techniques. The polymers are preferably made through an aqueous emulsion polymerization process, which can be conducted in a known manner including batch, semi-batch, or continuous polymerization techniques. The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system. Any quantity of the monomer(s) may be charged to the reactor vessel. The monomers may be charged batchwise or in a continuous or semicontinuous manner. By semi-continuous is meant that a plurality of batches of the monomer are charged to the vessel during the course of the polymerization. The independent rate at which the monomers are added to the kettle, will depend on the consumption rate with time of the particular monomer. Preferably, the rate of addition of monomer will equal the rate of consumption of monomer, i.e. conversion of monomer into polymer.

The reaction kettle is charged with water. To the aqueous phase there is generally also added a fluorinated surfactant, typically a non-telogenic fluorinated surfactant although aqueous emulsion polymerization without the addition of fluorinated surfactant may also be practiced. When used, the fluorinated surfactant is typically used in amount of 0.01% by weight to 1% by weight. Suitable fluorinated surfactants include any fluorinated surfactant commonly employed in aqueous emulsion polymerization. Particularly preferred fluorinated surfactants are those that correspond to the general formula:

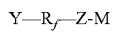

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Exemplary emulsifiers include: ammonium salts of perfluorinated alkanoic acids, such as perfluorooctanoic acid and perfluorooctane sulphonic acid.

Also contemplated for use in the preparation of the polymers described herein are emulsifiers of the general formula:

$$[R_f—O-L-COO^-]_iX_i^+ \quad (VI)$$

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3. Specific examples are described in, for example, US Pat. Publ. 2007/0015937 (Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF3O(CF_2)_3OCF(CF_3)COOH$, $CF_3CF_2CH_2OCF_2CH_2OCF_2COOH$,  $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts. In one embodiment, the molecular weight of the emulsifier is less than 1500, 1000, or even 500 grams/mole.

Also contemplated for use in the preparation of the polymers described herein are a hydrocarbon emulsifier, such as alkyl sulfonic acids, e.g. Hostapur SAS (from Clariant), or alkyl sulfates, e.g. sodium lauryl sulfate.

In addition to aqueous emulsion polymerization described herein, the fluoropolymers of the present disclosure can be made via an aqueous suspension polymerization.

In one embodiment, no organic emulsifier is used during the polymerization. For example, U.S. Publ. No. 2013-

0090441 (Baran et al.) teaches the preparation of fluoropolymers using inorganic nanoparticles.

These emulsifiers may be used alone or in combination as a mixture of two or more of them. In one embodiment, the amount of the emulsifier is well below the critical micelle concentration, generally within a range of from 250 to 5,000 ppm (parts per million), preferably 250 to 2000 ppm, more preferably 300 to 1000 ppm, and sometimes even up to 2 wt % based on the mass of water to be used.

A chain transfer agent may be used to control the molecular weight of the polymer so as to obtain the desired zero shear rate viscosity. Useful chain transfer agents include $C_2$-$C_6$ hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether.

In one embodiment, the polymerization is initiated after an initial charge of the monomer by adding an initiator or initiator system to the aqueous phase. For example peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert-butylperoxyacetate and tert-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Exemplary persulphates include: sodium peroxodisulphates, potassium peroxodisulphates, and ammonium peroxodisulphates.

Further initiators that can be used are ammonium-alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may also be added.

In one embodiment, it may be desirable to add a certain monomer to the polymerization in the form of an aqueous microemulsion. For example, fluorinated monomers that are liquid under the polymerization conditions may be advantageously added in the form of an aqueous microemulsion. The microemulsion of such monomers is preferably prepared using a fluorinated emulsifier. The microemulsion comprises a monomer, optional emulsifier, and fluorinated, low telogenic, inert liquids with boiling points higher than 100° C. Examples of such liquids include: (i) fluorinated cyclic hydrocarbons, such as octafluoronaphthalene, octafluorotoluene, hexafluorobenzene, perfluoroperhydrophenantrene ($C_{14}F_{24}$), perfluoroperhydrofluorene ($C_{13}F_{22}$), perfluoro decalin ($C_{10}F_{18}$), perfluoro methyl decalin ($C_{11}F_{20}$), perfluoro butyl decalin ($C_{14}F_{26}$), perfluorodimethylcyclohexane ($C_8F_{16}$), perfluoromethylcyclohexane ($C_7F_{14}$), perfluorodimethylcyclobutane ($C_6F_{12}$); (ii) fluorinated polyoxyalkenes of the formula $CF_2=CF-(CF_2)_1-O(R^a_fO)_n(R^b_fO)_mR^c_f$, where $R^a_f$ and $R^b_f$ are different perfluoroalkylene groups of 3 to 6 C-atoms, $R_{cf}$ is a perfluoroalkyl group of 1 to 6 C-atoms, 1 is 0 or 1, m and n are independently 0 to 10 and n+m is >2 or >3, examples include: $CF_3-CF_2-CF_2-(O-CF(-CF_3)-CF_2)_2-O-CF=CF_2$ (PPVE-3), $CF_3-CF_2-CF_2-(O-CF(-CF_3)-CF_2)_3-O-CF=CF_2$ (PPVE-4), $CHF_2-CF_2-CF_2-(O-CF(-CF_3)-CF_2)-O-CF=CF_2$ (HPPVE-2), $CHF_2-CF_2-CF_2-(O-CF(-CF_3)-CF_2)_2-O-CF=CF_2$ (HPPVE-3); (iii) fluorinated alkenes of the formula $F_3C-C(R^d_f)=C(R^e_f)(R^f_f)$ where $R^d_f$ and represent $R^e_f$ independently from each other fluorine or a perfluorinated or partially fluorinated, linear or branched alkyl group, preferably a group having from 1 to 6, preferably 1 to 3, carbon atoms and $R^f_f$ represents a perfluorinated, linear or branched alkyl group of 1 to 6 carbon atoms, preferably a methyl, ethyl, propyl or isopropyl group, examples include: $C(-CF_3)(-CF_3)=CF-CF_2-CF_3$ (HFP-Dimer), and $C(-CF_3)_2=C(-CF_2-CF_3)(-CF(-CF_3)_2)$ (HFP-Trimer); and (iv) fluorinated polyoxyalkanes of the formula $R^g_f-O-R^h_f-O-R^1_f$ where $R^g_f$ and $R^1_f$ are independently fluorinated alkyl groups of 2 to 5 C-atoms and $R^h_f$ is a branched perfluorinated alkyl group of 2 to 4 C-atoms, examples include: $CHF_2-CF_2-CF_2-O-CF(-CF_3)-CF_2-O-CFH-CF_3$ (HTFEE-2), $CHF_2-CF_2-CF_2-O-CF(-CF_3)-CF(-CF_3)-O-CF_2-CF_2-CHF_2$, and $CF_3-CF_2-CF_2-O-CF(-CF_3)-CF(-CF_3)-O-CF_2-CF_2-CF_3$. See for example, U.S. Pat. Publ. No. 2011/0294951 (Hintzer et al.), herein incorporated by reference.

The aqueous emulsion polymerization may be carried out at temperatures between 10 to 150° C., or even 30° C. to 110° C. and the pressure is typically between 2 and 50 bar, or even 5 to 30 bar. The reaction temperature may be varied during the polymerization to influence the molecular weight distribution, i.e., to obtain a broad molecular weight distribution or to obtain a bimodal or multimodal molecular weight distribution.

The aqueous emulsion polymerization system may further comprise auxiliaries, such as buffers and complex-formers.

The amount of polymer solids (i.e., fluorinated polymer particles) that can be obtained at the end of the polymerization is typically between 3-40%, 5-40%, 10-35%, or even 20-30% by weight. Upconcentration of the polymer dispersion can be conducted to increase the solids content, using techniques known in the art.

The fluoropolymers may have an average particle size (Z-average) of 20 to 400 nm, 20 to 300 nm, 20 to 200 nm, or even from about 20 nm to up to about 100 nm. The average particle sizes can be measured by the methods known in the art, for example, by inelastic light scattering (ISO 13321).

The fluoropolymers of the present disclosure may be semi-crystalline or amorphous fluoropolymers. Semi-crystalline fluoropolymers typically have a sharp melting point (i.e. a melting point wherein the melting has occurred within a range covering less than 3° C.), or they may have a melting range. The melting point or range typically is not greater than 330° C. or even no greater than 325° C. In one embodiment the melting point is between about 90° C. to about 330° C., or about 90° C. to about 325° C. The melting points can be measured, for example, by DSC. An amorphous fluoropolymer has no detectable crystalline character by DSC (differential scanning calorimetry). If studied under DSC, the amorphous fluoropolymer has no melting point or melt transitions with an enthalpy more than 2 milliJoules/g by DSC.

In one embodiment, the resulting polymers of the present disclosure have a Tg (glass transition temperature) between −50 and 150° C. or even −40 and 100° C.

The presence of acidic end-groups is known to be detrimental to certain properties of the fluoropolymer. In one embodiment, the fluoropolymers of the present disclosure have a low amount of acid end groups. Because of the monomers selected and the polymerization methods employed, in one embodiment, the fluoropolymers of the present disclosure have a minimal amount of ionic end-groups and thus, they do not require a heat treatment step to achieve the low integrated absorbance ratio disclosed herein. Acidic end groups include carboxyl, carboxylate, and carboxamide groups. The carbonyl content of a perfluorinated polymer may be determined by an integrated absorbance ratio method based on Fourier transform infrared analysis (FTIR) as described in U.S. Pat. No. 6,114,452 (Schmiegel) and U.S. Pat. No. 8,604,137 (Grootaert et al.). The method to determine the carboxyl, carboxylate, and carboxamide groups, relies on the baseline corrected integrated absorption underneath prominent peaks in the FT-IR spectrum of a pressed film of the fluorinated polymer. In particular, the integrated absorbance of the most prominent peaks between approximately 1620 cm$^{-1}$ to 1840 cm$^{-1}$ are measured. These peaks correspond to absorbances attributable to carbonyl moieties present in the polymer. This baseline corrected integrated absorbance under the most intense peaks within the range of 1620 cm$^{31\ 1}$ and 1840 cm$^{-1}$ is divided by the baseline corrected integrated absorbance of the C—F stretch overtone between 2220 cm$^{-1}$, and 2740 cm$^{-1}$, which is indicative of the thickness of the sample. This gives the carbonyl absorbance ratio which characterizes the carboxyl, carboxylate, and carboxamide content of the polymer. The polymers useful in this disclosure have an integrated absorbance ratio less than 0.1, 0.08, 0.07, less than 0.04, or even less than 0.03.

The above described method discloses a method of polymerizing a fluorinated terminal alkene monomer with a tertiary amine-containing fluorinated monomer disclosed herein (e.g., vinyl amine, substituted vinyl amine, allyl amine, substituted allyl amine, and combinations thereof) to form a fluorinated polymer dispersion. The polymerization can be done in the presence of an emulsifier, such as a fluorinated emulsifier or a non-fluorinated emulsifier.

As used herein the term "emulsifier" is used to refer to a compound, which stabilizes an emulsion during a polymerization by migrating to the interface between the continuous (e.g. water) and the particle phases and imparting electrostatic, steric, or a combination of these repulsive forces to maintain the total surface area of the interface. A "surfactant" is used herein to refer to a compound, which stabilizes a polymerized dispersion. A compound used as an emulsifier may or may not be used as a surfactant. Thus, emulsifiers listed herein may or may not be used as surfactants and vice versa. Generally, emulsifiers are used in lower concentrations than surfactants, for example, a compound may be used up to 1 wt % or 2 wt % as an emulsifier versus total dispersion weight, but as a surfactant used at concentrations of at least 2 wt %, or even 5 wt %, and at most 10 wt % versus total dispersion weight.

Because there has been an interest in the elimination of residual fluorinated emulsifiers/surfactants in fluoropolymer products; in one embodiment, the polymers can be made in the presence of a fluorinated emulsifier and then the fluorinated emulsifier may be removed from the fluoropolymer dispersion using techniques in the art (such as anion exchange methods). Depending on the particular method for reducing the fluorinated emulsifier; a non-fluorinated, non-ionic, and/or anionic surfactant can be used as the stabilizing agent. Crude dispersions (i.e., dispersion directly from the polymerization of the fluorinated monomers) typically have a solids content of 3 to 40%, or even 10 to 40% by weight. Non-fluorinated surfactants are typically added to the crude dispersions in amount sufficient to provide a desired dispersion stability after reduction of the fluorinated surfactant. An amount from 0.5 to 20% by weight, 1 to 12%, or even 1 to 10% by weight of non-ionic/anionic surfactant is generally sufficient for this purpose. Although reducing the amount of fluorinated surfactant in the crude dispersion is generally preferred, it is also possible to reduce the amount of fluorinated surfactant while upconcentrating the dispersion or after upconcentration of the dispersion. If an upconcentrated dispersion is used, the amount of solids may be between 20 and 70% or even 40 and 70% by weight, for example between 45 and 65% by weight.

Exemplary methods for removal of fluorinated emulsifier include the following.

A non-ionic non-fluorinated surfactant is added to the aqueous dispersion and the so obtained dispersion is contacted with an anion or cation exchange (to remove cations, e.g. Mn$^{2+}$) resin and/or upconcentrated. See U.S. Pat. Nos. 6,833,403 and 5,463,021.

In another embodiment, the amount of fluorinated surfactant may be reduced by ultrafiltration. The method of ultrafiltration comprises the steps of (a) adding non-ionic and/or anionic non-fluorinated surfactant to a dispersion and (b) circulating the dispersion over a semi-permeable ultrafiltration membrane to separate the dispersion into a fluorinated polymer dispersion and an aqueous permeate. See U.S. Pat. No. 4,369,266.

In another embodiment, the amount of fluorinated surfactant may be reduced in the dispersion through distillation of the free acid form of the surfactant. This process can be used if the surfactant in its free acid form is steam volatile. Typically, this method involves adding a non-ionic and/or anionic emulsifier to the aqueous fluoropolymer dispersion and removing steam-volatile fluorinated emulsifier by distillation until the concentration of steam-volatile fluorinated emulsifier in the dispersion reaches the desired value. See U.S. Pat. No. 6,794,550.

Suitable non-fluorinated non-ionic surfactants include those described in "Nonionic Surfactants", M. J. Schick (ed.), Marcel Dekker, Inc., New York 1967. Examples of non-ionic surfactants can be selected from the group of alkylarylpolyethoxy alcohols, polyoxyalkylene alkyl ether surfactants, polysorbates and alkoxylated acetylenic diols, preferably ethoxylated acetylenic diols and mixtures of such surfactants.

In one embodiment, the non-ionic surfactant or mixture of non-ionic surfactants corresponds to the general formula:

$$R^1—O—[CH_2CH_2O]_n—[R_2O]_m—R^3 \quad\quad (VII)$$

wherein R$^1$ represents a linear or branched aliphatic or aromatic hydrocarbon group having at least 8 carbon atoms, preferably 8 to 18 carbon atoms, R$^2$ represents an alkylene having 3 carbon atoms, R$^3$ represents hydrogen or a C$_1$—C$_3$ alkyl group, n has a value of 0 to 40, m has a value of 0 to 40 and the sum of n+m is at least 2. When the above general formula represents a mixture, n and m will represent the average amount of the respective groups. Also, when the above formula represents a mixture, the indicated amount of carbon atoms in the aliphatic group $R^1$ may be an average number representing the average length of the hydrocarbon group in the surfactant mixture. Commercially available non-ionic surfactant or mixtures of non-ionic surfactants include those available from Clariant GmbH under the trade designation "GENAPOL" such as "GENAPOL X-080", a surfactant according to the above formula (XV) in which m is 0 and "GENAPOL PF 40" a surfactant in which both n and m are non-zero. Further suitable non-ionic surfactants that are commercially available include the trade designations "TERGITOL TMN 6" or "TERGITOL TMN 100X", "TERGITOL TMN 10", and "TRITON X-100".

According to a further embodiment, a mixture of one or more surfactants according to formula (VII) in which m is 0 with one or more surfactants according to formula (XV) with n and m each being non-zero can be used. An example of such a mixture is a mixture of GENAPOL X-080 and GENAPOL PF 40.

Further non-ionic surfactants that can be used include alkoxylated acetylenic diols, for example ethoxylated acetylenic diols. The ethoxylated acetylenic diols for use in this embodiment preferably have a HLB between 11 and 16. Commercially available ethoxylated acetylenic diols that may be used include those available under the trade designation "SURFYNOL" from Air Products, in particular "SURFYNOL 465". Still further useful non-ionic surfactants include polysiloxane based surfactants such as those under the trade designation "SILWET L77" commercially available from Crompton Corp.

Exemplary anionic non-fluorinated surfactants include surfactants that have an acid group, in particular a sulfonic or carboxylic acid group. Anionic non-fluorinated surfactants may include in addition to one or more anionic groups also other hydrophilic groups such as polyoxyalkylene groups having 2 to 4 carbons in the oxyalkylene group, such as polyoxyethylene groups. Typical non-fluorinated surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as for example oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include those available under the trade designations "POLYSTEP A16" (sodium dodecylbenzyl sulphonate) from Stepan Company, "HOSTAPUR SAS 30" (secondary alkyl sulphonate sodium salt), "EMULSOGEN LS" (sodium lauryl sulfate) and "EMULSOGEN EPA 1954" (mixture of $C_{12}$ to $C_{14}$ sodium alkyl sulfates) available from Clariant GmbH, "EDENOR C-12" (Lauric acid) available from Cognis and "TRITON X-200" (sodium alkylsulfonate) available from DOW Chemical Co., Midland, Mich. Further suitable anionic surfactants include the sulfosuccinates disclosed in EP Nos. 1538177 and EP 1526142.

The polymers or dispersions comprising the polymers disclosed herein may be used in coating compositions. If used for a coating solution, it may be desirable to increase the amount of fluoropolymer solids in the dispersion. To increase the amount of fluoropolymer solids, any of the upconcentration techniques known in the art may be used. These upconcentration techniques are typically carried out in the presence of a non-ionic surfactant, which is added to stabilize the dispersion in the upconcentration process. Suitable methods for upconcentration include ultrafiltration, thermal upconcentration, thermal decantation and electrodecantation as disclosed in U.S. Pat. No. 7,279,522 (Dadalas et al., herein incorporated by reference).

The method of ultrafiltration comprises the steps of (a) adding non-ionic surfactant to a dispersion that desirably is to be upconcentrated and (b) circulating the dispersion over a semi-permeable ultra-filtration membrane to separate the dispersion into a fluorinated polymer dispersion concentrate and an aqueous permeate. The circulation is typically at a conveying rate of 2 to 7 meters per second and effected by pumps which keep the fluorinated polymer free from contact with components which cause frictional forces. The method of ultrafiltration further has the advantage that during upconcentration also some low molecular weight fluorinated emulsifier is removed. Accordingly, the method of ultrafiltration may be used to simultaneously reduce the level of low molecular weight fluorinated emulsifier and upconcentrate the dispersion.

To increase the fluoropolymer solids in an aqueous fluoropolymer dispersion, thermal decantation may also be employed. In this method, a non-ionic surfactant is added to the fluoropolymer dispersion that is desirably upconcentrated and the dispersion is then heated so as to form a supernatant layer that can be decanted and that typically contains water and some non-ionic surfactant while the other layer will contain the concentrated dispersion. This method is for example disclosed in U.S. Pat. No. 3,037,953 (Barnard) and U.S. Pat. No. 6,153,688 (Tashiro et al.), herein incorporated by reference.

Thermal upconcentration involves heating of the dispersion and removal of water under a reduced pressure until the desired concentration is obtained.

For the purpose of, for example, enhancing the strength or imparting the functionality, conventional adjuvants, such as, for example, acid acceptors, process aids, or colorants may be added to the composition.

Such fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the finished product. The filler components may result in a material that is capable of retaining a preferred elasticity and physical tensile, as indicated by an elongation and tensile strength value, while retaining desired properties such as retraction at lower temperature (TR-10).

In one embodiment, the composition comprises less than 40, 30, 20, 15, or even 10% by weight of the inorganic filler.

Conventional adjuvants may also be incorporated into the composition of the present disclosure to enhance the properties of the resulting composition. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from about 1 to about 20 parts per 100 parts by weight of the polymer.

A solution or liquid dispersion containing the fluorinated polymer, and other components described above may be prepared using a solvent such as ketone (e.g., acetone, methyl ethyl ketone, methyl isobutyl ketone), ether (e.g., diethyl ether, tetrahydrofuran), fluorinated solvents (such as inert fluorinated liquids), and ester (e.g., ethyl acetate, butyl acetate), the solution or liquid dispersion prepared may be coated on the surface of a substrate such as paper, fiber, fabric, metal, glass, ceramic, plastic, wood, and combinations thereof, and the solvent may be removed by drying. In this way, an article containing a composition layer and a substrate can be formed.

In one embodiment, the amorphous fluoropolymer can be cured to form a fluoroelastomer. Crosslinking of the amorphous fluoropolymer can be performed generally with a peroxide, a polyol, or a polyamine cure system (or curative).

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a crosslinking aid such as diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide. Examples of the organic peroxide include benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl O,O'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluoropolymer. Other conventional radical initiators are suitable for use with the present disclosure.

The crosslinking using a polyol is performed generally by using a polyol compound as a crosslinking agent, a crosslinking aid such as ammonium salt, phosphonium salt and iminium salt, and a hydroxide or oxide of a divalent metal such as magnesium, calcium, or zinc. Examples of the polyol compound include bisphenol AF, bisphenol A, bisphenol S, dihydroxybenzophenone, hydroquinone, 2,4,6-trimercapto-S-triazine, 4,4'-thiodiphenol, and a metal salt thereof.

The crosslinking using a polyamine is performed generally by using a polyamine compound as a crosslinking agent, and an oxide of a divalent metal such as magnesium, calcium, or zinc. Examples of the polyamine compound or the precursor of the polyamine compound include hexamethylenediamine and a carbamate thereof, 4,4'-bis(aminocyclohexyl)methane and a carbamate thereof, and N,N'-dicinnamylidene-1,6-hexamethylenediamine.

This crosslinking agent, crosslinking aid, and acid-receiving agent composed of a hydroxide, oxide, or the like of a divalent metal, each may be used in a conventionally known amount, and the amount used can be appropriately determined by one skilled in the art while taking into consideration the miscibility with the fluoropolymer, mechanical strength of the crosslinked fluoropolymer, profitability and the like. The amount used of each of these components participating in the crosslinking may be, for example, about 1 part by mass or more, about 5 parts by mass or more, about 10 parts by mass or more, or about 15 parts by mass or more, and about 60 parts by mass or less, about 40 parts by mass or less, about 30 parts by mass or less, or about 20 parts by mass or less, per 100 parts by mass of the fluoropolymer. The total amount of the components participating in the crosslinking may be, for example, about 1 part by mass or more, about 5 parts by mass or more, or about 10 parts by mass or more, and about 60 parts by mass or less, about 40 parts by mass or less, or about 30 parts by mass or less, per 100 parts by mass of the fluoropolymers.

Exemplary embodiments of the present disclosure include, but are not limited to the following:

Embodiment 1

An aqueous dispersion comprising a fluorinated polymer comprising:
an aqueous continuous phase; and
a plurality of fluorinated polymer particles, wherein the fluorinated polymer particle comprises interpolymerized units of (i) a fluorinated terminal alkene monomer and (ii) a tertiary amine-containing fluorinated monomer comprising at least one of a vinyl amine, a substituted vinyl amine, an allyl amine, a substituted allyl amine, and combinations thereof.

Embodiment 2

The aqueous dispersion of embodiment 1, further comprising a hydrocarbon surfactant.

Embodiment 3

The aqueous dispersion of embodiment 2, wherein the aqueous dispersion comprises at least 2 wt % and at most 10 wt % of the hydrocarbon surfactant.

Embodiment 4

The aqueous dispersion of any one of the previous embodiments, wherein the aqueous dispersion comprises 5 to 60% by weight of the plurality of fluorinated polymer particles.

Embodiment 5

The aqueous dispersion of any one of the previous embodiments, wherein the fluorinated terminal alkene monomer is tetrafluoroethylene.

Embodiment 6

The aqueous dispersion of any one embodiments 1-2, wherein the fluorinated terminal alkene monomer comprises at least one of tetrafluoroethylene; vinylidene fluoride; hexafluoropropylene;chlorotrifluoroethylene; 2,3,3,3-tetrafluoropropene; and combinations thereof Embodiment 7

The aqueous dispersion of any one of the previous embodiments, wherein the tertiary amine-containing fluorinated monomer is of the formula:

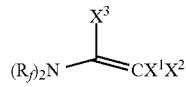
(I)

where $X^1$ is selected from H or F; $X^2$ is selected from H or F; $X^3$ is selected from H or F; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Embodiment 8

The aqueous dispersion of any one of embodiments 1-6, wherein the tertiary amine-containing fluorinated monomer is of the formula:

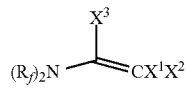
(II)

where $X^1$ is selected from H, F, or CF3; $X^2$ is selected from H or F; $X^3$ is selected from H, F, or a C1-C4 alkyl or a C1-C4 fluoroalkyl, wherein at least one of $X^1$, $X^2$ or $X^3$ is not H or F; and each Rf group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Embodiment 9

The aqueous dispersion of any one of the previous embodiments, wherein the tertiary amine-containing fluorinated monomer comprises at least one of :

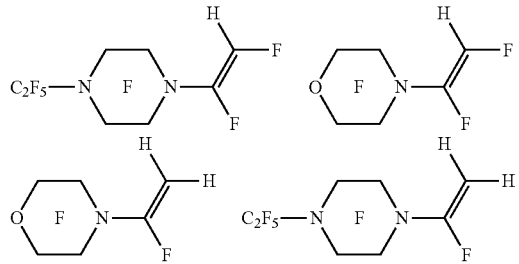

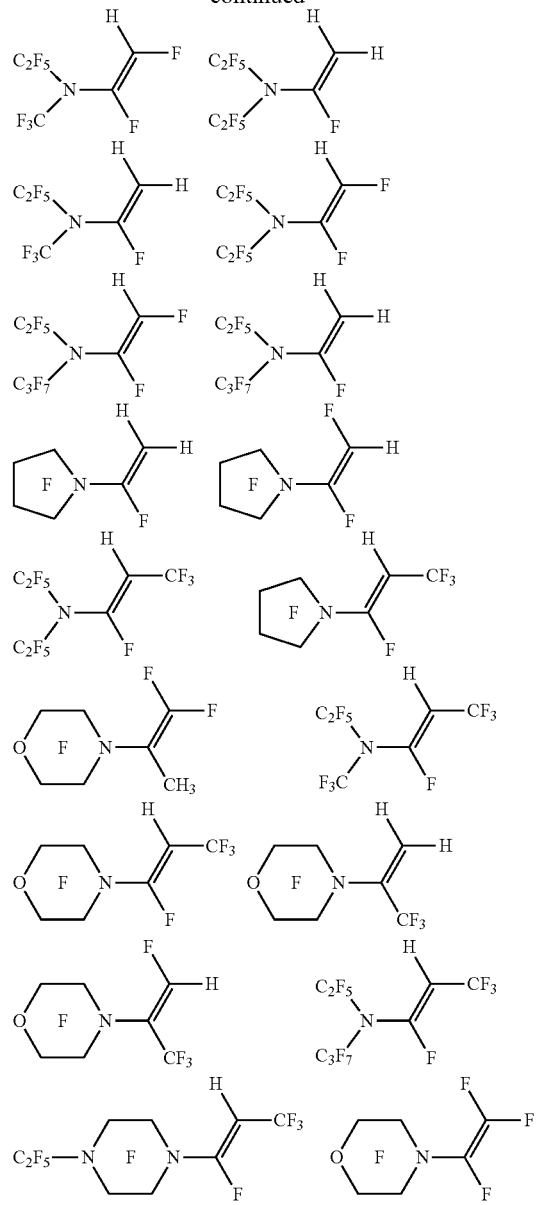

and combinations thereof.

Embodiment 10

The aqueous dispersion of any one of embodiments 1-6, wherein the tertiary amine-containing fluorinated monomer is of the formula:

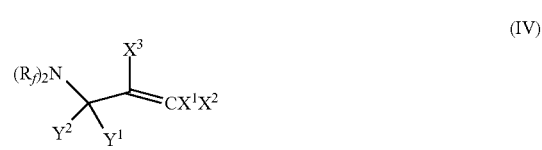
(IV)

where $X^1$, $X^2$, and $X^3$ are independently selected from H, or F;
$Y^1$ is H or F; $Y^2$ is F or CF3; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Embodiment 11

The aqueous dispersion of any one of embodiments 1-6, wherein the tertiary amine-containing fluorinated monomer is of the formula:

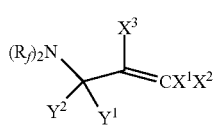
(V)

where $X^1$, $X^2$, and $X^3$ are independently selected from H, F, or $CF_3$;
$Y^1$ is H or F; $Y^2$ is F or $CF_3$; wherein at least one of $X^1$, $X^2$, or $X^3$ is $CF_3$; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

Embodiment 12

The aqueous dispersion of any one of embodiments 1-6, wherein the tertiary amine-containing fluorinated monomer comprises at least one of:

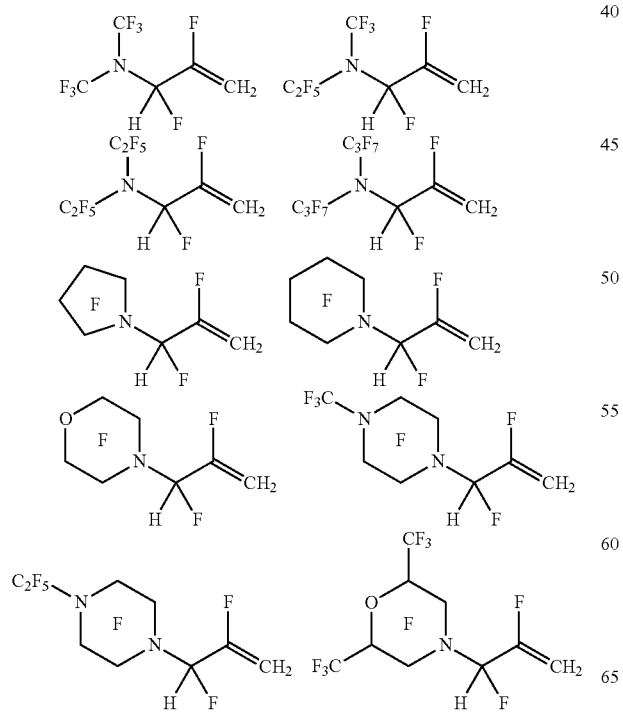

-continued

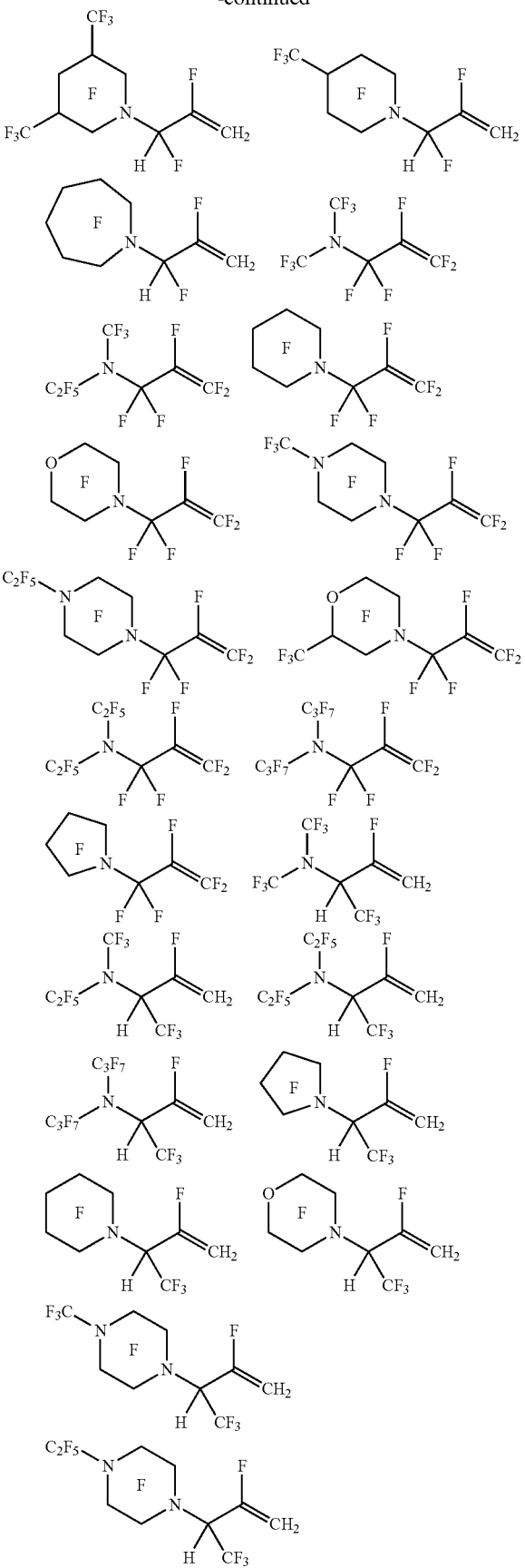

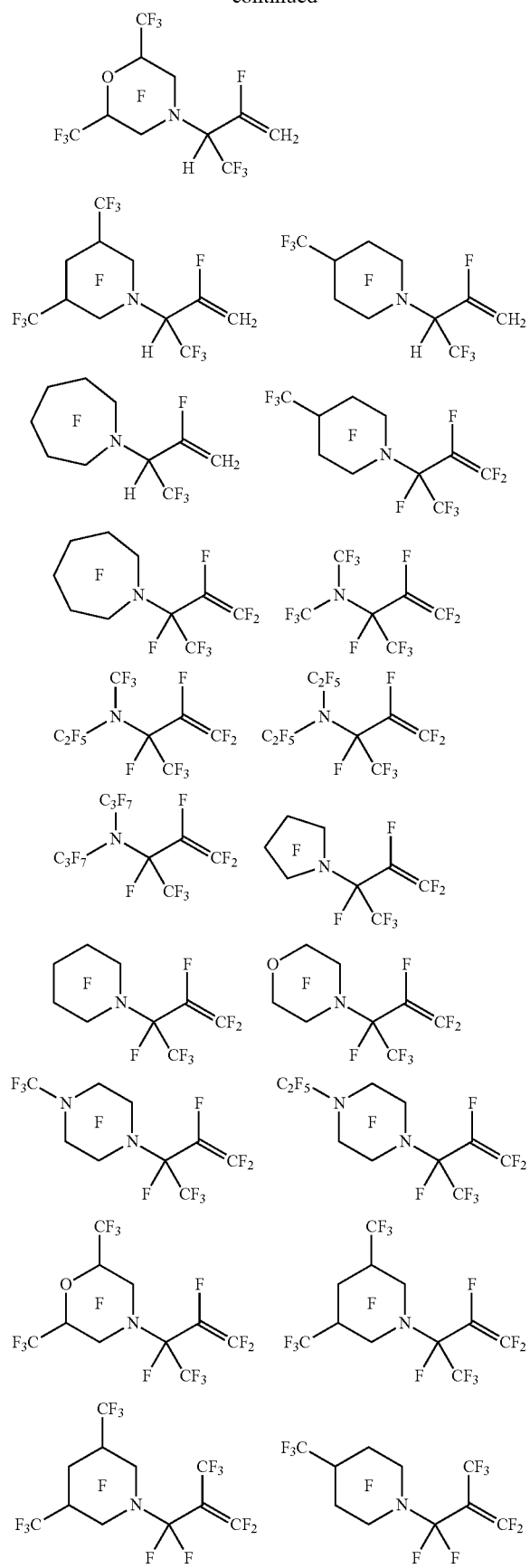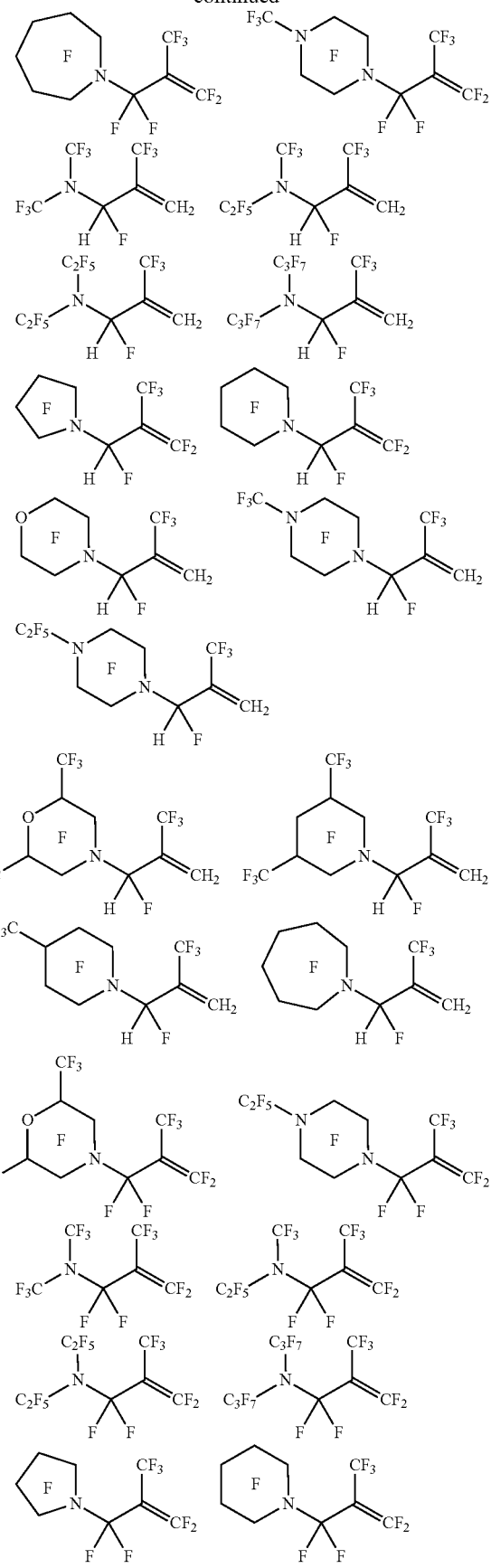

-continued

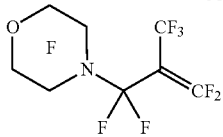

and combinations thereof.

Embodiment 13

The aqueous dispersion of any one of the previous embodiments, wherein the hydrocarbon surfactant is non-ionic or anionic.

Embodiment 14

The aqueous dispersion of any one of the previous embodiments, wherein the fluorinated polymer particles of the plurality of fluorinated polymer particles have an average particle diameter of 30 to 400 nm.

Embodiment 15

The aqueous dispersion of any one of the previous embodiments, further comprising a fluorinated liquid.

Embodiment 16

The aqueous dispersion of any one of the previous embodiments, wherein the fluorinated polymer particle comprises a cure-site selected from Br, I, nitrile, and combinations thereof.

Embodiment 17

The aqueous dispersion of any one of the previous embodiments, wherein the fluorinated polymer particle is semi-crystalline.

Embodiment 18

The aqueous dispersion of embodiment 15, wherein the fluorinated polymer particle has a melting point no greater than 325° C.

Embodiment 19

The aqueous dispersion of any one of the previous embodiments, wherein the fluorinated polymer particle is amorphous.

Embodiment 20

A polymer comprising: interpolymerized units of (i) a fluorinated terminal alkene monomer and (ii) a tertiary amine-containing fluorinated monomer comprising at least one of a vinyl amine, a substituted vinyl amine, an allyl amine, a substituted allyl amine, and combinations thereof; wherein the polymer is amorphous or is semi-crystalline with a melting point no greater than 325° C.

Embodiment 21

The polymer of embodiment 20, wherein the polymer comprises an integrated absorbance ratio less than 0.1.

Embodiment 22

The polymer of any one of embodiment 20-21, wherein the polymer is amorphous.

Embodiment 23

The polymer of any one of embodiment 20-21, wherein the polymer has a Tg between −50° C. and 150° C.

Embodiment 24

An article comprising the polymer of any one of embodiments 20-23.

Embodiment 25

A coating composition comprising the polymer of any one of embodiments 20-23.

Embodiment 26

A method of coating a substrate comprising: contacting the aqueous dispersion of any one of embodiments 1-19 onto a substrate.

Embodiment 27

The method of embodiment 26, wherein the substrate is comprises at least one of metal, glass, wood, ceramic, fabric, plastic, and combinations thereof.

Embodiment 28

A method of making a fluoropolymer comprising: polymerizing in an aqueous continuous phase, (i) a fluorinated terminal alkene monomer and (ii) a tertiary amine-containing fluorinated monomer comprising at least one of a vinyl amine, a substituted vinyl amine, an allyl amine, a substituted allyl amine, and combinations thereof.

Embodiment 29

The method of making a fluoropolymer further comprising hydrocarbon surfactant.

EXAMPLES

Unless otherwise noted, all chemicals used in the examples can be obtained from Sigma-Aldrich Corp. (Saint Louis, Mo.).

The following abbreviations are used in this section: NMR=nuclear magnetic resonance, ml=milliliters, L=iters, s=seconds, min=minutes, g=grams, μm=micrometers, mm=millimeters, m=meters, ppm=parts per million, mol=mole, w %=percent by weight, d50=average diameter Characterization Methods The indicated results were obtained using the following test methods, unless otherwise noted.

Solid Content

Solid content was determined gravimetrically by placing samples of the dispersions on a heated balance and recording the mass before and after evaporation of solvent. The solid content was the ratio of the initial mass of the sample and the mass of the sample when the mass did not decrease further with continued heating. See ISO 12086:2006.

Particle Size

The size of particles in the polymer dispsersions was determined by dynamic light scattering using an instrument available from Malvern, Worchestershire, UK, under the trade designation "Zetasizer 1000HSA," following a similar procedure as described in DIN ISO 13321:2004-10. The reported average particle size was the z-average. Prior to the measurements, the polymer latices as yielded from the polymerizations were diluted with 0.01 mol/L NaCl solution, available from Riedel-de Haen. The measurement temperature was 20° C. in all cases.

Melting Point

The melting point of the polymer was determined using differential scanning calorimetry following a similar procedure to that described in ASTM D4591-07 (2012) using a PerkinElmer Pyris 1 DSC (Waltham, Mass.) under nitrogen flow with a heating rate of 10° C./min. The reported melting points relate to the melting peak maximum.

Critical Film Thickness (CFT)

A container was filled with the test dispersion. Foam, if present, was removed using a pipette. A degreased aluminum plate (19 mm×4 mm×4 mm) was dipped in the dispersion and dried with the plate hanging at an angle of 45°. The plate was allowed to dry for 5 min, after which it was heated at 200° C. for 10 min. The plate was cooled and the coating was evaluated for cracks using a microscope. The maximum crack-fee thickness was measured using a thickness gauge (MiniTest 4000 available from ElectroPhysik, Cologne, Germany).

Viscosity

The viscosity of the dispersion was measured using a rheometer (DV-III using software available under the trade designation "RHEOCALC 3.2" from Brookfield AMETEK, Middleboro, Mass.), spindle 86, at temperatures of 20° C. and 40° C. The shear rate was 20 l/s.

Example 1 (EX-1)

A 4 L polymerization kettle was charged with 2.6 L of $H_2O$ and 65 g of $CF_3$—O—$CF_2CF_2CF_2$—O—$CHFCF_2$—$COONH_4$ (which can be prepared as described in Compound 12 of U.S. Pat. No. 7,671,112 Hintzer, et al.) and stirred with an agitator speed of 320 rpm. The kettle was heated to 70° C. The kettle was then charged with VDF until a pressure of 14.0 bar was reached. The polymerization was initiated by adding 4 g of APS (ammonium persulfate, $(NH_4)_2S_2O_8$). 202 g of VDF and 109 g of perfluoro-N-vinyl morpholine (NVM, which can be synthesized as described in T. Abe, et al. *Chem. Lett.* 1989, 905) were added continuously over 120 min. The reaction was stopped. The resulting polymer dispersion had a solid content of 10 wt %. The average particle size of the polymer in the dispersion was 107 nm. 281 g of polymer were isolated by coagulation. A melting point of 158° C. was found.

Example 2 (EX-2)

A 4 L polymerization kettle was charged with 2.6 L of $H_2O$ and 130 g of $CF_3$—O—$CF_2CF_2CF_2$—O—$CHFCF_2$—$COONH_4$ and stirred at an agitator speed of 320 rpm. The kettle was heated to 70° C. The kettle was then charged with VDF until a pressure of 14.0 bar was reached. The polymerization was initiated by adding 4 g of APS. 82 g of VDF and 100 g of NVM were added continuously over 72 min. The reaction was stopped. The resulting polymer dispersion had a solid content of 5 wt %. The average particle size of the polymer in the dispersion was 60 nm. 146 g of polymer were isolated by coagulation. A melting point of 156° C. was found.

Example 3 (EX-3)

A 4 L polymerization kettle was charged with 2.6 L of $H_2O$, 130 g of $CF_3$—O—$CF_2CF_2CF_2$—O—$CHFCF_2$—$COONH4$, and 10 g of NVM and stirred at an agitator speed of 320 rpm. The kettle was heated to 70° C. The kettle was then charged with TFE until 14.0 bar was reached. The polymerization was initiated by adding 4 g of APS. 230 g of TFE and 80 g of NVM were added continuously over 72 min. The reaction was stopped. The resulting polymer dispersion had a solid content of 9 wt %. The average particle size of the polymer in the dispersion was 35 nm. 280 g of polymer were isolated by coagulation. A melting point of 323° C. was found.

Example 4 (EX-4)

A 4 L-polymerization kettle was charged with 2.6 L of $H_2O$, 130 g of $CF_3$—O—$CF_2CF_2CF_2$—O—$CHFCF_2$—$COONH4$, 5 g of perfluoro N-vinylpyrolidine (NVP, which can be synthesized as described in T. Abe, et al. *Chem. Lett.* 1989, 905) and stirred at an agitator speed of 320 rpm. The kettle was heated up to 90° C. Then VDF was charged until 14.0 bar was reached. The polymerization was initiated by adding 1 g of APS. Over 125 min, 200 g of VDF, 89 g perfluoro N-vinylpyrolidine (NVP) and 0.8 g of APS were added continuously. The reaction was stopped. The resulting polymer dispersion had a solid content of 10 wt %. The average particle size of the polymer in the dispersion was 102 nm. The polymer was isolated by freeze coagulation. A melting point of 150° C. was found. The MFI was 0.07 g/10 min (230° C., 5 kg).

Example 5 (Ex-5)

A 4 L-polymerization kettle was charged with 2.6 L of $H_2O$, 130 g of $CF_3$—O—$CF_2CF_2CF_2$—O—$CHFCF_2$—$COONH4$, 9 g of perfluoro N-vinylpyrolidine (NVP) and stirred at an agitator speed of 320 rpm. The kettle was heated up to 90° C. Then TFE was charged until 14.0 bar was reached. The polymerization was initiated by adding 1 g of APS. Over 154 min, 220 g of TFE, 60 g of NVP and 1.3 g of APS were added continuously. The reaction was stopped. The polymer was isolated by freeze coagulation. A melting point of 319° C. was found.

Example 6 (Ex-6)

A 4 L-polymerization kettle was charged with 2.6 L of $H_2O$, 130 g of CF3—O—$CF_2CF_2CF_2$—O—$CHFCF_2$—$COONH_4$, 6 g of perfluoro N-allylmorpholine (NAM, which can be synthesized as described in JP 01070444A (Abe); and JP 0107445A (Abe)) and stirred at an agitator speed of 320 rpm. The kettle was heated up to 90° C. Then VDF was charged until 14.0 bar was reached. The polymerization was initiated by adding 1 g of APS. Over 84 min, 200 g of VDF, 99 g perfluoro N-allylmorpholine (NAM) and 1.4 g of APS were added continuously. The reaction was stopped. The resulting polymer dispersion had a solid content of 11 wt %. The average particle size of the polymer in the dispersion was 65 nm. The polymer was isolated by freeze coagulation. A melting point of 151° C. was found. The MFI was 0.30 g/10 min (230° C., 5 kg).

Example 7 (Ex-7)

A 4 L-polymerization kettle was charged with 2.6 L of $H_2O$, 130 g of $CF_3-O-CF_2CF_2CF_2-O-CHFCF_2-COONH_4$, 11 g of NAM and stirred at an agitator speed of 320 rpm. The kettle was heated up to 90° C. Then TFE was charged until 6.0 bar was reached. The polymerization was initiated by adding 1 g of APS. Over 90 min, 100 g of TFE, 30 g perfluoro N-allylmorpholine (NAM) and 5 g of APS were added continuously. The reaction was stopped. The resulting polymer dispersion had a solid content of 5 wt %. The average particle size of the polymer in the dispersion was 61 nm. The polymer was isolated by freeze coagulation. A melting point of 319° C. was found.

Example 8

20 g of a surfactant (90%, available under the trade designation "TERGITOL TMN-100X" available from Dow Chemical Co., Midland, Mich.) was added to 2.3 kg of the latex dispersion from Ex-4. The pH was then adjusted with ammonia solution (25 wt %) to pH=9.0. Additionally, 500-600 g of diluted TERGITOL TMN-100X aqueous solution (25% by mass) was added and the latex dispersion was heated for 8 h at 75-95° C. After cooling, two phases were obtained and the upper phase was removed. The pH value of the concentrated dispersion (i.e. the lower phase) was then adjusted with ammonia solution to pH=9.5. The resulting solid content of the concentrated dispersion was 36 wt % for the copolymer latex and had a viscosity of 20.7 and 34.1 mPas (20° C. and 40° C., respectively).

The concentrated dispersion was then dip coated onto an aluminum plate as described in the CFT method described above. The CFT was 14 micrometers.

Example 9

26 g of a surfactant (90%, available under the trade designation "TERGITOL TMN-100X" available from Dow Chemical Co., Midland, Mich.) was added to 2.3 kg of the latex dispersion from Ex-6. The pH was then adjusted with ammonia solution (25 wt %) to pH=9.0. Additionally, 500-600 g of diluted TERGITOL TMN-100X aqueous solution (25% by mass) was added and the latex dispersion was heated for 8 h at 75-95° C. After cooling, two phases were obtained and the upper phase was removed. The pH value of the concentrated dispersion (i.e. the lower phase) was then adjusted with ammonia solution to pH=9.5. The resulting solid content of the concentrated dispersion was 47 wt % for the copolymer latex.

The concentrate dispersion then was treated with an anion exchange resin (available under the trade designation "AMBERJET 4200 CL" from Dow Chemical Co, Midland, Mich.) to reduce the concentration of the fluorinated emulsifier $(CF_3-O-CF_2CF_2CF_2-O-CHFCF_2-COONH_4)$. After ion exchange, the final concentration of the fluorinated emulsifier was 34 ppm. The resulting dispersion had had a viscosity of 117 and 399 mPas (20° C. and 40° C., respectively).

Example 10

A 50wt % solution of TERGITOL TMN-100X was added to 1 liter of latex from EX-7 to obtain a dispersion with 10 wt % nonionic surfactant based on fluoropolymer solids. The mixture then was thermally up-concentrated by using vacuum-distillation (a rotary evaporated) with a 70° C. water bath and pulling a 300 mbar vacuum to obtain a polymer dispersion having a 32 wt % solid content.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will control.

What is claimed is:

1. An aqueous dispersion comprising a fluorinated polymer comprising:
   (a) an aqueous continuous phase; and
   (b) a plurality of fluorinated polymer particles, wherein the fluorinated polymer particle comprises interpolymerized units of (i) a fluorinated terminal alkene monomer and (ii) a tertiary amine-containing fluorinated monomer wherein the tertiary amine-containing fluorinated monomer is selected from at least one of the following formulas:

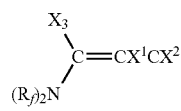

(II)

where $X^1$ is selected from H, F, or $CF_3$; $X^2$ is selected from H or F; $X^3$ is selected from H, F, or a $C_1$-$C_4$ alkyl or a $C_1$-$C_4$ fluoroalkyl, wherein at least one of $X^1$, $X^2$ or $X^3$ is not H or F; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom; or

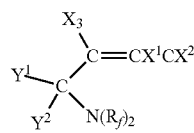

(V)

where $X^1$, $X^2$, and $X^3$ are independently selected from H, F, or $CF_3$;
$Y^1$ is H or F; $Y^2$ is F or $CF_3$; wherein at least one of $X^1$, $X^2$, or $X^3$ is $CF_3$; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

2. The aqueous dispersion of claim 1, wherein the aqueous dispersion comprises at least 2 wt% and at most 10 wt% of a hydrocarbon surfactant.

3. The aqueous dispersion of claim 2, wherein the hydrocarbon surfactant is non-ionic or anionic.

4. The aqueous dispersion of claim 1, wherein the tertiary amine-containing fluorinated monomer comprises at least one of:

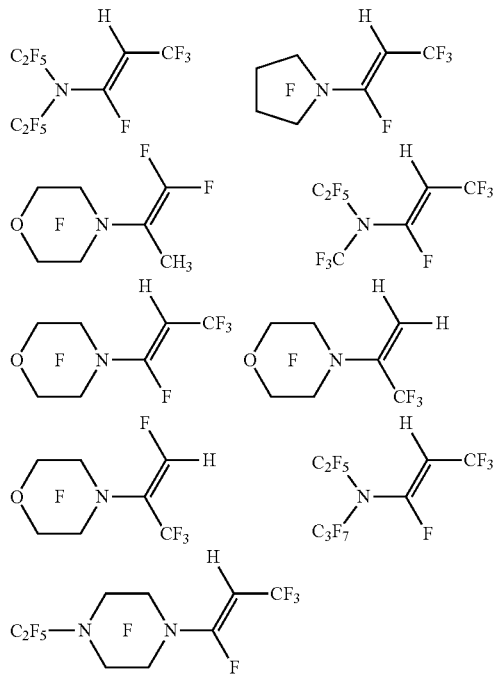

and combinations thereof.

5. A coating composition comprising the aqueous dispersion of claim 1.

6. A method of coating a substrate comprising: contacting the aqueous dispersion of claim 1 onto a substrate.

7. The aqueous dispersion of claim 1, wherein the aqueous dispersion comprises 5 to 60% by weight of the plurality of fluorinated polymer particles.

8. The aqueous dispersion of claim 1, wherein the fluorinated terminal alkene monomer comprises at least one of tetrafluoroethylene; vinylidene fluoride; hexafluoropropylene; chlorotrifluoroethylene; 2,3,3,3-tetrafluoropropene; and combinations thereof.

9. The aqueous dispersion of claim 1, wherein the fluorinated polymer particles of the plurality of fluorinated polymer particles have an average particle diameter of 30 to 400 nm.

10. The aqueous dispersion of claim 1, further comprising a fluorinated liquid.

11. The aqueous dispersion of claim 1, wherein the fluorinated polymer particle is semi-crystalline.

12. The aqueous dispersion of claim 1, wherein the fluorinated polymer particle is amorphous.

13. The aqueous dispersion of claim 1, wherein the tertiary amine-containing fluorinated monomer comprises at least one of:

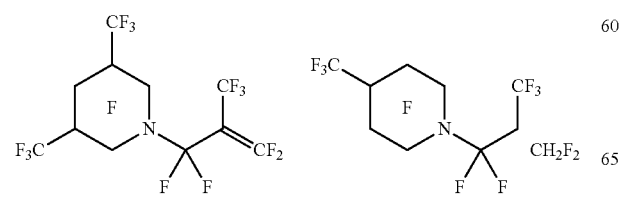

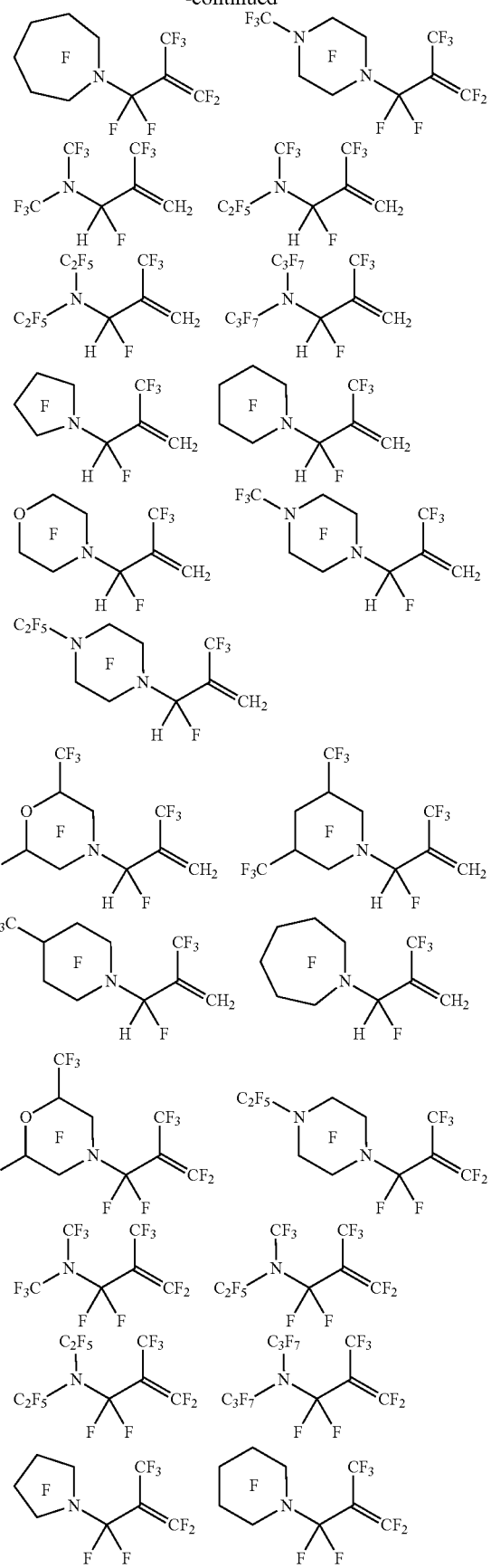

-continued

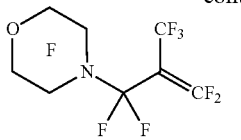

and combinations thereof.

14. A method of making a fluoropolymer comprising:

polymerizing in an aqueous continuous phase, (i) a fluorinated terminal alkene monomer and (ii) a tertiary amine-containing fluorinated monomer wherein the tertiary amine-containing fluorinated monomer is selected from at least one of the following formulas:

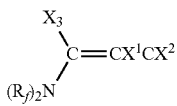

(II)

where $X^1$ is selected from H, F, or $CF_3$; $X^2$ is selected from H or F; $X^3$ is selected from H, F, or a $C_1$-$C_4$ alkyl or a $C_1$-$C_4$ fluoroalkyl, wherein at least one of $X^1$, $X^2$ or $X^3$ is not H or F; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom; or

(V)

where $X^1$, $X^2$, and $X^3$ are independently selected from H, F, or $CF_3$;

$Y^1$ is H or F; $Y^2$ is F or $CF_3$; wherein at least one of $X^1$, $X^2$, or $X^3$ is $CF_3$; and each $R_f$ group are (i) independently selected from a linear or branched perfluorinated alkyl group comprising 1 to 8 carbon atoms and optionally comprising at least one catenated O or N atom; or (ii) bonded together to form a ring structure comprising 4 to 8 carbon atoms and optionally comprising at least one catenated O or N atom.

* * * * *

UNITED STATES PATENT AND TRADEMARK OFFICE
CERTIFICATE OF CORRECTION

PATENT NO. : 10,703,833 B2
APPLICATION NO. : 15/781163
DATED : July 7, 2020
INVENTOR(S) : Mike Bulinski It is certified that error appears in the above-identified patent and that said Letters Patent is hereby corrected as shown below:

On the Title Page

Column 2,
Under "Other Publications," Line 3, delete "a." and insert -- al., --, therefor.

In the Specification

Column 4,
Line 31, delete "(III) :" and insert -- (III): --, therefor.
Line 49, delete "CF3" and insert -- $CF_3$ --, therefor.

Column 6,
Line 28, delete "ally" and insert -- allyl --, therefor.
Line 48, delete "ally" and insert -- allyl --, therefor.

Column 9,
Line 62, delete "CF3" and insert -- $CF_3$ --, therefor.

Column 10,
Line 33, delete "$R^{f'}$" and insert -- $R_{f'}$ --, therefor.
Line 33, delete "$R^f$ are" and insert -- $R_f$ are --, therefor.
Line 44, delete "(CF3" and insert -- ($CF_3$ --, therefor.
Line 51, delete "CF2" and insert -- $CF_2$ --, therefor.

Column 11,
Line 25, delete "U=I" and insert -- U=I --, therefor.
Lines 37 & 38, delete "$CF_2$=$CFO(CF_2)_3$—O—$CF_2CF_2I$," and insert
-- $CF_2$=$CFO(CF_2)_3$—$OCF_2CF_2I$, --, therefor.
Line 53, delete "$(CF_2)_1$" and insert -- $(CF_2)_t$ --, therefor.
Line 58, delete "$CF_2$=CF" and insert -- $CF_2$=CF --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*

Column 12,
Line 40, Delete "[$R_f$—O—L—COO$^-$]$_1$X$_1^+$" and insert -- [$R_f$—O—L—COO$^-$]$_i$X$_i^+$ --, therefor.
Line 50, delete "CF3" and insert -- $CF_3$ --, therefor.

Column 14,
Line 2, delete "($CF_2$)$_1$" and insert -- $(CF_2)_l$ --, therefor.
Line 5, delete "1 is" and insert -- l is --, therefor.
Line 24, delete "$R^1_f$where $R^g_f$and $R^1_f$are" and insert -- $R^i_f$ where $R^g_f$ and $R^i_f$ are --, therefor.

Column 15,
Line 31, delete "cm$^{31\ 1}$" and insert -- cm$^{-1}$ --, therefor.

Column 16,
Line 58, delete "[$R_2O$]$_m$" and insert -- $[R^2O]_m$ --, therefor.

Column 19,
Lines 45 & 46, delete "O,O'-bis(1,1-dimethylethyl)" and insert -- OO,OO'-bis(1,1-dimethylethyl) --, therefor.

Column 21,
Line 3, delete "thereof" and insert -- thereof. --, therefor.
Line 39, delete "CF3;" and insert -- $CF_3$; --, therefor.

Column 22,

Lines 17-21, delete " 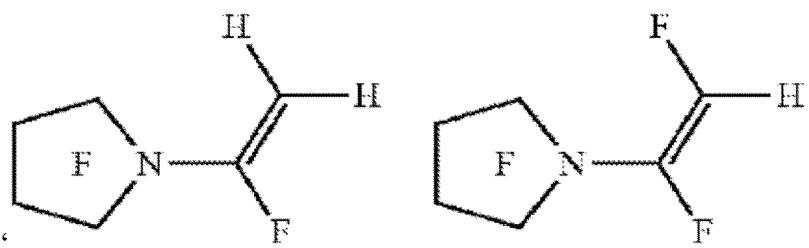 " and insert  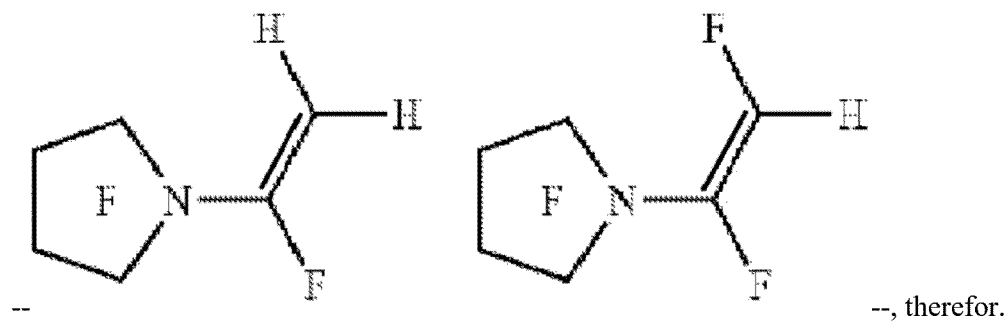 --, therefor.

Column 26,
Lines 17-22, delete " 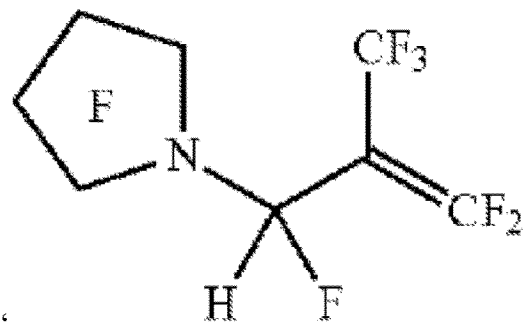 and insert
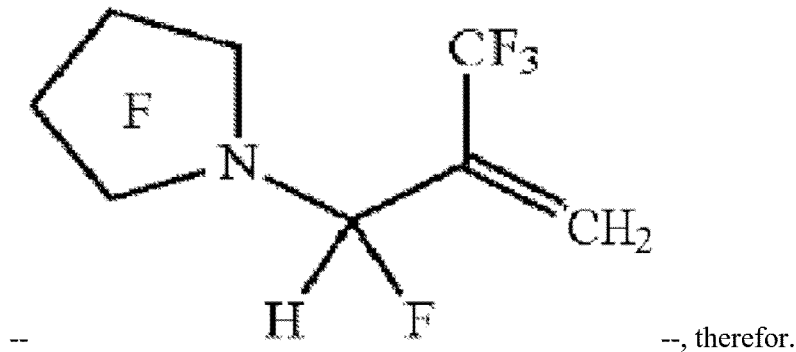 --, therefor.
Lines 17-22, delete " 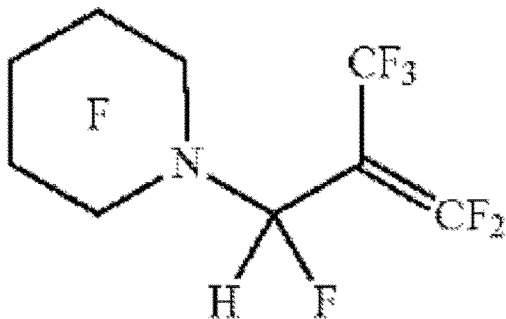 " and insert
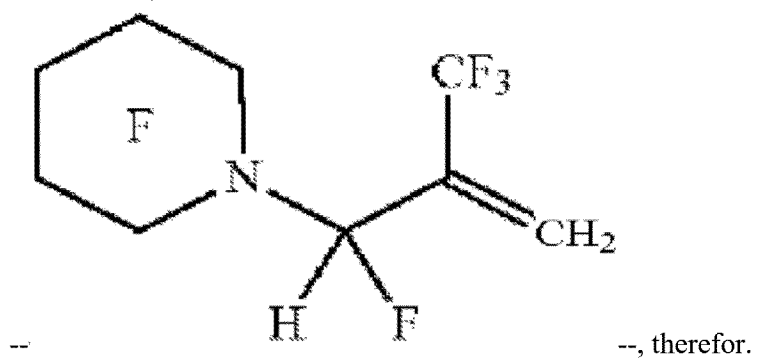 --, therefor.
Column 28,
Line 46, Before "hydrocarbon" insert -- a --.
Column 29,
Line 24, Delete "45° ." and insert -- 45°. --, therefor.
Line 36, Delete "1/s." and insert -- 1/s. --, therefor.

CERTIFICATE OF CORRECTION (continued)
U.S. Pat. No. 10,703,833 B2

Line 60, Delete "CF3" and insert -- $CF_3$ --, therefor.

Column 30,
Line 9, Delete "COONH4," and insert -- $COONH_4$, --, therefor.
Line 24, Delete "COONH4," and insert -- $COONH_4$, --, therefor.
Line 42, Delete "COONH4," and insert -- $COONH_4$, --, therefor.
Line 54, Delete "CF3" and insert -- $CF_3$ --, therefor.

Column 31,
Line 4, Delete "CF3" and insert -- $CF_3$ --, therefor.